Figure 4:
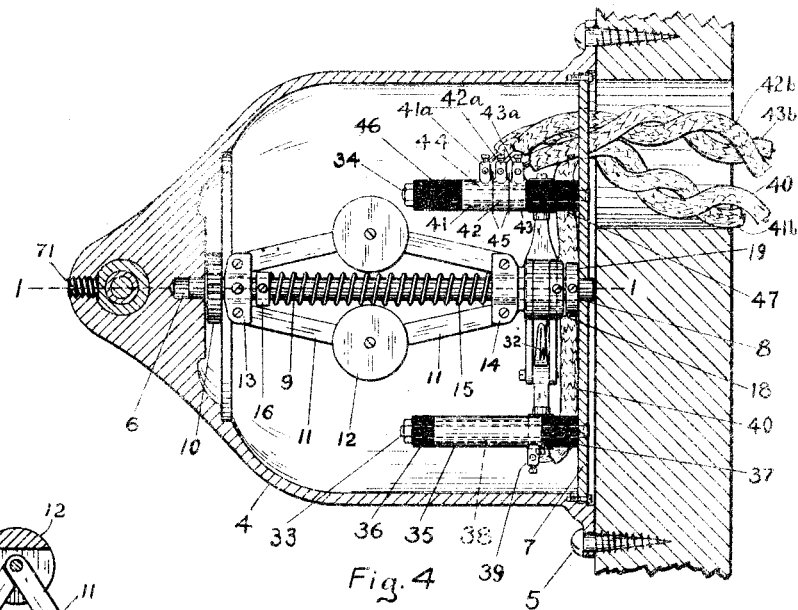

H. R. ELLIOTT.
AUXILIARY VISUAL INDICATOR.
APPLICATION FILED JAN. 23, 1912.
1,065,672.
Patented June 24, 1913.
2 SHEETS—SHEET 1.
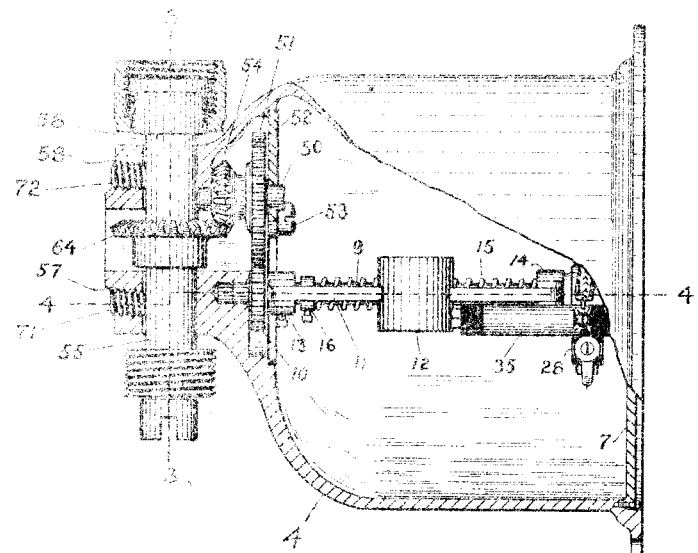
Fig. 1
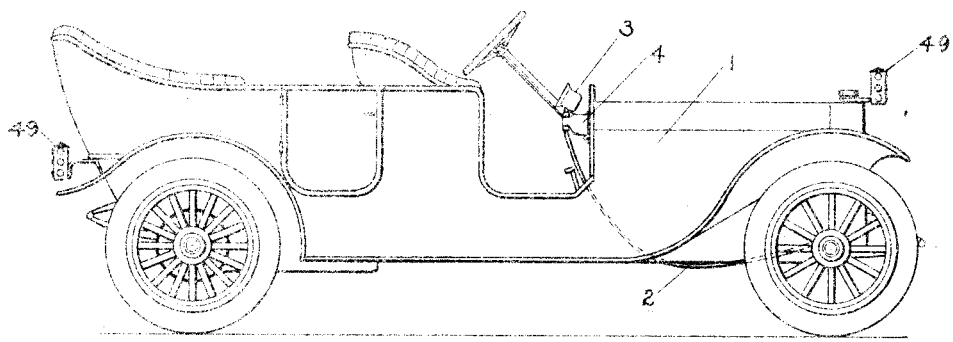
Fig. 2
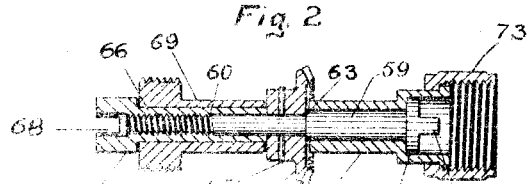
Fig. 3
Witnesses:
Inventor
Harlie R. Elliott
By C. C. Shepherd
Attorney

H. R. ELLIOTT.
AUXILIARY VISUAL INDICATOR.
APPLICATION FILED JAN. 22, 1912.

1,065,672.

Patented June 24, 1913.
2 SHEETS—SHEET 2.

Witnesses
J. C. Drumm
A. L. Phelps

Inventor
Harlie R. Elliott.
By C. C. Shepherd
Attorney

UNITED STATES PATENT OFFICE.

HARLIE R. ELLIOTT, OF COLUMBUS, OHIO, ASSIGNOR, BY MESNE ASSIGNMENTS, TO AUTO SPEED SIGNAL COMPANY, OF LOS ANGELES, CALIFORNIA, A CORPORATION OF CALIFORNIA.

AUXILIARY VISUAL INDICATOR.

1,065,672.  Specification of Letters Patent.  Patented June 24, 1913.

Application filed January 22, 1912. Serial No. 672,781.

*To all whom it may concern:*

Be it known that I, HARLIE R. ELLIOTT, a citizen of the United States, residing at Columbus, in the county of Franklin and State of Ohio, have invented certain new and useful Improvements in Auxiliary Visual Indicators, of which the following is a specification.

My invention relates to auxiliary visual indicators and is particularly applicable to a motor vehicle, being intended and designed to give a visual signal distinctly characteristic for each range of speed of the vehicle, the ranges of speed to be denoted being the result of the requirement of city ordinances placing speed limit restrictions upon traffic in certain sections of such cities.

The invention contemplates the provision of an attachment for motor vehicles desirably constructed for driving by the flexible shaft of the speedometer and constructed and calculated to automatically display to a pedestrian or to some one within or without the vehicle, the rate of speed at which the vehicle is moving at any time. It is particularly efficacious in application to motor vehicles in that it may be made to serve as an indication to some person in authority within the district through which the vehicle is passing of the approximate speed at which the vehicle is traveling and whether or not such speed is excessive for the section of the district through which such vehicle is moving.

In view of the increasing congestion of traffic in our cities, it has become and is becoming more and more necessary to prescribe definite maximum speed limits at which a vehicle may travel in any section of the city. In practically all cities, such maximum speed limits have been prescribed, but the enforcement of them is rendered exceedingly difficult for the reason that the driver of the vehicle inevitably fails to realize that he is traveling at an excessive speed. In addition to this, officers of the law placed upon cases of this nature and empowered with duties of this character, are either extremely lax or overzealous. As a result constant bickerings and disputes arise between vehicle driver and the officer and these bickerings and disputes are carried into the trial courts.

My purpose is to provide an automatically operative attachment to vehicles of this type which will be positive and definite in its action and which will unfailingly indicate to the driver and to the officer the exact maximum speed within which the vehicle is traveling.

Another essential feature of my invention or rather result thereof, is the effect that it will undoubtedly have in decreasing the number of accidents, such as people being run over by a vehicle traveling at a high rate of speed. It is a practical impossibility for the pedestrian, about to pass in front of a traveling motor vehicle, to accurately gage the speed of such vehicle. For this very reason a great number of people are run down in attempting to pass in front of a vehicle, whereas with my invention the visual indication is unfailing and practically all possibility of such mistakes is obviated.

The advantageous structural features of my invention are mainly comprised in the provision of such a construction as will permit of a ready interposition between the flexible drive shaft of a speedometer and the speedometer. This construction is desirably such that my attachment may be applied practically without disfigurement of the normal structure of the machine, and the speedometer may still remain operative or may be entirely omitted. In the adaptation of my invention in such a manner, one of the important features thereof is the compact and accurately operative gear mechanism utilized.

Figure 5:
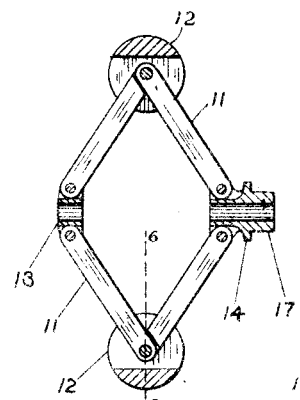
Figure 6:
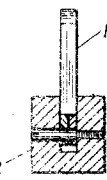
Figure 7:
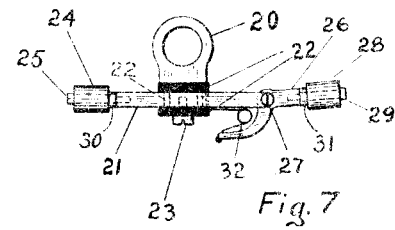
Figure 8:
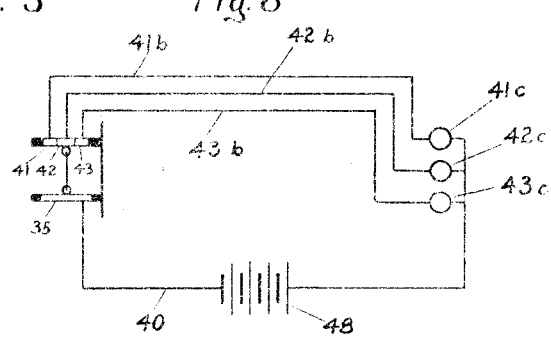

The preferred embodiment of my invention is shown in the accompanying drawings, in which similar characters of reference designate corresponding parts and in which, Figure 1 is a side elevation partially broken away of my invention, Fig. 2 is a side elevation of an automobile showing my invention applied thereto, Fig. 3 is a section of my gear mechanism taken on line 3—3 of Fig. 1, Fig. 4 is a section taken on line 4—4 of Fig. 1, Fig. 5 is a detail view of a governor mechanism desirably utilized in my invention, Fig. 6 is a section taken on line 6—6 of Fig. 5, Fig. 7 is a detail view of a movable bridging element movable under the control of centrifugal members in the embodiment of my invention shown, and, Fig. 8 is a diagrammatic view showing the independent circuits which are adapted for successive closure under steadily increasing speed of the vehicle to which my invention is applied.

In the drawings, the vehicle is shown at 1 as having a flexible speedometer shaft 2 driven from a wheel in any desired manner, such for instance as the customary manner of driving. This shaft 2 desirably extends to the speedometer 3, but there is interposed therebetween the circuit closing structure comprised in the casing 4. The casing 4 may be of any suitable form and may be provided with means of attachment 5. It comprises an internal bearing socket 6 and is fitted with a detachable base 7 having a complemental bearing aperture 8, such aperture receiving and supporting a rotatable shaft 9. The shaft 9 is provided near its upper or outer end with a rigidly secured gear wheel 10 and below such gear wheel carries a governor of centrifugal form embodying arms 11, weights 12, a rigid hinge thimble 13, a traveling hinge collar 14 and an interposed spring 15, whose tension is adjustable by adjustment of the collar 16 upon the shaft 9. The collar 14 has an annular shoulder 17 thereon and in superposed relatively adjustable relation below such shoulder are collars 18 and 19. The collar 19 may be adjusted within a small range and by such adjustment it becomes possible to more firmly and rigidly maintain the shaft against wabbling and in a definite central position.

Carried between the shoulder 17 and collar 18 is the bridging element shown in Fig. 7 and comprising an embracing collar bracket 20 carrying a radially extending arm member 21 insulated therefrom by an insulation 22 and secured thereto by a screw 23. The arm member 21 is provided upon one extremity with a roller 24 secured upon its end by a screw bolt 25 and having its opposite end bifurcated for the reception of a pivoted roller carrying element 26. This element is pivoted at 27 and upon its outermost extremity has a roller 28 rotatably secured upon its end by a screw bolt 29. It will be noted that both rollers 24 and 28 have reduced abutting elements of an integral nature as shown at 30 and 31 respectively. The inner extremity of the arm pivoted element 26 is laterally offset and is normally forced laterally outward by a spring 32. This lateral forcing of the lateral portion outward serves to maintain the rollers 24 and 28 slightly out of alinement for a purpose to be hereinafter described.

Carried by the base member 7 are spaced posts 33 and 34. The post 33 is surrounded at a point intermediate its ends by a metallic cylindrical element 35, such contact element being preferably of brass and this element 35 is insulated from the post by sections 36, 37 and 38. The element 35 is further provided with a binding post as at 39 for the attachment of a wire 40. The post 34 is substantially similar in its nature to the post 33, but the cylindrical metallic embracing portion thereof is divided into contact sections 41, 42 and 43 respectively carrying binding posts 41$^a$, 42$^a$ and 43$^a$ for the attachment of wires 41$^b$, 42$^b$ and 43$^b$. The contact sections 41, 42 and 43 are insulated from the post by the cylindrical insulation 44 and are insulated from each other by mica disks 45. They are further insulated from the post by sections 46 and 47.

In operation, it being understood that the governor shaft is driven by the flexible drive shaft in a manner to be hereinafter described, it will be apparent that the radial arm member 21 bridges the posts 33 and 34. As the speed of travel of the vehicle increases, the weights 12 fly outward and draw the collar bracket member 20 upwardly. The first effect is the closing of the circuit from a battery 48 through the wire 40, binding posts 39, contact 35, bridge member 21, contact 43, binding post 43$^a$, wire 43$^b$ and lamp 43$^c$. It is hardly necessary to trace the remaining circuits, but it will be understood that each contact segment is of a size to cover a certain range of speed and that the contact of the bridge member with each segment, closes a circuit through one of the lamps 41$^c$, 42$^c$ and 43$^c$, which are desirably mounted together upon the forward end of the vehicle hood as at 49. When the speed of the vehicle exceeds the maximum limit of the section 41$^c$, the lights go out entirely for the reason that the bridge member passes above such section 43$^a$ and breaks the circuit.

The upper or outer end of the casing 4 is desirably recessed in a suitable manner for the reception of a shaft 50 which is vertically disposed and carries a gear wheel 51 meshing with the gear 10 on the shaft 9. This shaft 50 is supported in position by the plate 52 desirably retained in place by screws 53. The shaft 50 is further provided with a horizontally disposed beveled gear 54. Extending transversely through the outer end of the casing 4 are registering bearings 55 and 56 and these bearings are intersected by threaded bores 57 and 58. These bearings are for the support of a shaft element which is constructed and adapted for ready connection with the end of the commonly used flexible shaft and which comprises a bolt 59 having a reduced threaded extension 60 and a head 61 with a diametrically extending formation 62. The formation of the reduced extension 60 produces a shoulder 63 against which there is adapted to abut a bevel gear 64 held in place by a pin 65 and further reinforced by the internally threaded sleeve 66 abutting thereagainst and having a head 67 with a diametrical slot 68 formed therein. This structure, when assembled, is integral in its nature and is supported by spaced sleeves 69 and 70 flattened upon their upper surfaces and held against rotation in their bearings by set screws 71 and 72. The sleeve 70 has a shoulder formation and for connection to the speedometer there may be provided an internally threaded cap 73. The sleeve 69 has a threaded enlargement 74 and any suitable connection may be provided for attaching the flexible driving shaft thereto, it being understood that the end of the driving shaft is of a construction to have an interfitting driving relation to the socketed sleeve 67. This is likewise true of the speedometer with relation to the opposite end of the bolt 59. It will be readily understood that location of the flexible driving shaft transmits motion to the mechanism of the speedometer if one is in use, and further transmits motion to the shaft of the governor by means of the intermediate gearing described.

It will be understood from the above description that I have provided a structure of mechanism which unfailingly gives a visual indication when the machine is traveling at an excessive rate of speed, or which, as a matter of fact indicates at all times the approximate rate of speed of the machine by denoting that it is not in excess of a certain or certain maximum limits. The structure utilized is simple and efficient.

What I claim, is—

1. In a device of the character described, the combination with a pair of spaced elongated electrical contact members, one of which is continuous throughout its length and the other of which is sub-divided longitudinally into a plurality of contact surfaces, of a centrifugally operated member which travels longitudinally of said contact members, a bridging element carried by said centrifugally operated member and lying transversely with relation to the contact members and establishing electrical communication therebetween, said bridging element being capable of rotary movement around the centrifugally operated member and comprising two terminal portions pivotally connected to move in a plane perpendicular to the axes of the contact members, and resilient means bearing between said terminal portions and tending to produce relative movement between them.

2. In a device of the character described, the combination with a pair of spaced, fixed contact members which lie in substantial parallelism with each other, of a bridging element extending transversely thereof and establishing electrical communication therebetween, a rotative shaft lying between said contact members and parallel therewith, means for imparting rotation to said shaft, a member slidably mounted upon said shaft and centrifugally operated elements actuated by the rotation of said shaft and connected to said slidably mounted member and serving to impart movement to said member longitudinally of said shaft, said bridging element being carried by said slidably mounted member, whereby bodily movement is imparted to the bridging element longitudinally of the contact member when said shaft is rotated, said bridging element being capable of movement around said slidably mounted member and comprising two parts pivotally connected to move in a plane perpendicular to the axes of the contact members, and resilient means bearing between said parts and tending to produce relative movement between said parts.

3. In a device of the character described, the combination with a pair of spaced fixed contact members which lie in substantial parallelism with each other, of a rotative shaft lying between said contact members and in parallelism with said contact members, a bridging element extending transversely between said contact members and establishing electrical communication therebetween, a member slidably mounted upon said shaft, centrifugally operated elements actuated by the rotation of said shaft and connected to said slidably mounted member to impart movement to said member longitudinally of said shaft, said bridging element being carried by said slidably mounted member whereby bodily movement is imparted to the bridging element longitudinally of the contact member when said shaft is rotated, said bridging element being capable of rotative movement around said slidably mounted member and comprising two pivotally connected terminal portions, one of which contacts with one of said contact members and the other of which contacts with the other of said contact members, both of said terminal portions lying upon the same side of the longitudinal axes of said contact members, and a spring bearing between said pivotally connected terminal portions and tending to cause relative movement between them.

4. As an article of manufacture, a bridging element comprising a pair of terminal portions, means for pivotally connecting said terminal portions, a yoke from which said terminal portions are supported, means for insulating said yoke from said terminal portions, and spring means bearing between said terminal portions and tending to produce relative movement between them.

5. As an article of manufacture, a yoke, a bridging element, means for insulating said bridging element from said yoke, said bridging element comprising a pair of pivotally connected terminal portions, a curved finger carried by one of said portions and extending into substantial parallelism with the other of said portions and in spaced relation thereto, and a spring bearing between said finger and said other terminal portion.

In testimony whereof I affix my signature in presence of two witnesses.

HARLIE R. ELLIOTT.

Witnesses:
WALTER E. L. BOCK,
A. L. PHELPS.